(12) United States Patent
Suggs et al.

(10) Patent No.: US 7,694,166 B1
(45) Date of Patent: Apr. 6, 2010

(54) INTEGRATING CONTROL OF SERVICE DURING CLUSTER FAILOVER

(75) Inventors: Darrell G. Suggs, Raleigh, NC (US); Robert L. Fair, Cary, NC (US); Jeffrey S. Kimmel, Chapel Hill, NC (US); Alan L. Rowe, San Jose, CA (US); Joydeep Sen Sarma, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 526 days.

(21) Appl. No.: 11/292,160

(22) Filed: Nov. 30, 2005

(51) Int. Cl.
*G01F 11/00* (2006.01)
(52) U.S. Cl. .......................... 714/4; 709/211
(58) Field of Classification Search ...................... 714/4
See application file for complete search history.

(56) References Cited

U.S. PATENT DOCUMENTS

| | | | |
|---|---|---|---|
| 5,276,867 A | 1/1994 | Kenley et al. | |
| 5,287,500 A * | 2/1994 | Stoppani, Jr. ................ | 711/211 |
| 6,263,364 B1 | 7/2001 | Najork et al. | |
| 6,408,006 B1 | 6/2002 | Wolff | |
| 6,496,515 B2 | 12/2002 | Lefebvre et al. | |
| 6,728,748 B1 * | 4/2004 | Mangipudi et al. .......... | 718/105 |
| 6,728,897 B1 | 4/2004 | Cramer et al. | |
| 6,748,510 B1 | 6/2004 | Coatney | |
| 6,757,695 B1 | 6/2004 | Noveck et al. | |
| 6,920,505 B2 | 7/2005 | Hals et al. | |
| 6,941,384 B1 * | 9/2005 | Aiken et al. ................. | 709/250 |
| 7,130,891 B2 | 10/2006 | Bernardin et al. | |
| 7,194,538 B1 * | 3/2007 | Rabe et al. ................... | 709/224 |
| 7,240,234 B2 * | 7/2007 | Morita et al. .................. | 714/4 |
| 7,275,103 B1 * | 9/2007 | Thrasher et al. ............. | 709/224 |
| 7,321,982 B2 * | 1/2008 | Coatney et al. ................ | 714/4 |
| 2004/0230675 A1 | 11/2004 | Freimuth et al. | |
| 2005/0204183 A1 * | 9/2005 | Saika ............................ | 714/4 |
| 2006/0253621 A1 | 11/2006 | Brewer et al. | |

FOREIGN PATENT DOCUMENTS

GB    2 121 995    1/1984

OTHER PUBLICATIONS

Mokbel M. F. et al., "Scalable Multimedia Disk Scheduling", Data Engineering, 2004. Proceedings. 20th International Conference on Boston, MA Mar. 30-Apr. 2, 2004, Piscataway, NJ, IEEE, Mar. 30, 2004, p. 498-509.

Cuneyt Akinlar et al., "A Scalable Bandwidth Guaranteed Distributed Continuous Media File System Using Network Attached Autonomous Disks", IEEE Transactions on Multimedia, IEEE Service Center, Piscataway, NJ, vol. 5, No. 1, Mar. 2003, p. 71-96.

(Continued)

*Primary Examiner*—Scott T Baderman
*Assistant Examiner*—Kamini Patel
(74) *Attorney, Agent, or Firm*—Blakely, Sokoloff, Taylor & Zafman LLP (57) ABSTRACT

A clustered storage server detects an offline condition in another storage server in the cluster and executes a cluster takeover procedure which includes taking control of the storage system associated with the offline storage server, and merging a local control-of-service policy with a control-of-service policy associated with the offline storage server.

24 Claims, 10 Drawing Sheets

OTHER PUBLICATIONS

Aref W. G. et al., "An Inexpensive, Scalable, and Open-Architecture Media Server", Internet Technologies and Services, 1999. Proceedings. First IEEE/Popov Workshop on Oct. 25-28, 1999, Piscataway, NJ, IEEE, Oct. 25, 1999, p. 36-43.

Dimitrijevic Z., Rangaswami, R., "Quality of Service Support for Real-Time Storage Systems", International IPSI-2003, 2003, p. 1-8.

Craig S. Mullins, "Architectures for Clustering: Shared Nothing and Shared Disk", DB2magazine, http://www.db2mag.com/db_area/archives/2002/q1/mullins.shtml, Quarter 1, 2002, pp. 1-8.

NETAPP, "Network Appliance-Filers—Clustered Failover High-Availability Solution", http://www.netapp.com/products/software/clustered.html?fmt-print, Copyright 2005 prior to filing of this application, pp. 1-3.

* cited by examiner

INTEGRATING CONTROL OF SERVICE DURING CLUSTER FAILOVER

CROSS REFERENCE TO RELATED APPLICATION

This application is related to U.S. patent application Ser. No. 11/166,478, titled "Control of Service Workload Management," filed Jun. 23, 2005, which is hereby incorporated by reference.

FIELD OF THE INVENTION

At least one embodiment of the present invention pertains to storage systems, and more particularly, to a method and apparatus for integrating control of service during failover in a clustered storage server system.

BACKGROUND

A storage server is a special-purpose processing system used to store and retrieve data on behalf of one or more client processing systems ("clients") in a client/server model of information processing and distribution. A storage server can be used for many different purposes, such as to provide multiple users with access to shared data or to backup mission critical data.

A storage server may operate on behalf of one or more clients to store and manage and/or control shared files in a storage system, such as magnetic or optical storage based disks or tapes. In a large scale network, a storage server might be a dedicated network-attached storage (NAS) device that serves as a remote disk drive for other computers on the network. A storage server may include a storage operating system that implements a file system to logically organize the information as a hierarchical structure of directories and files on the disks. Each on-disk file may be implemented as a set of data blocks configured to store information, such as text or image data, whereas the directories may be implemented as specially-formatted metadata files in which information about other files and directories is stored. Metadata is data about data. The purpose of metadata is to provide a consistent and reliable means of access to data. The metadata may be stored in a physical location or may be in a virtual database, in which metadata is drawn from separate sources. Metadata may include information about how to access specific data, or specific characteristics of the data, such as size, content or organization for example. Alternatively, the storage server may provide clients with block-level access to stored data (as opposed to file-level access), such as may be employed in a storage area network (SAN). A SAN is a network that transfers data between computer systems and storage systems via peripheral channels such as SCSI (small computer system interface) or Fibre Channel.

In a client/server system, the client may be an application executing on a computer that communicates with the storage server over a computer network, such as a point-to-point link, shared local area network (LAN), wide area network (WAN), or virtual private network (VPN) implemented over a public network such as the Internet. Each client may request the services of the storage server by issuing file system protocol messages to the storage server over the network.

As used herein, the term "storage operating system" generally refers to the computer-executable code operable on a storage system that manages and/or controls data access and client access requests to storage servers. In this sense, the Data ONTAP™ operating system, available from Network Appliance, Inc., which implements a write anywhere file layout (WAFL™) file system, is an example of such a storage operating system. The operating system can also be implemented as an application program operating over a general-purpose operating system, such as UNIX® or Windows NT®, or as a general-purpose operating system with configurable functionality, which is configured for storage applications as described herein.

A storage server organizes the files on its attached storage system into one or more logical volumes that may span one or more physical storage devices, and "mounts" the logical volumes into the network filing system, defining an overall logical arrangement of storage space. Each volume is associated with its own file system and typically consists of a directory tree with a root directory, subdirectories and files. Mounting a volume makes the files in the volume accessible to network users without reference to a physical device. A volume is mounted by attaching its root directory to a location in a hierarchical network filing system, so that the directories of the mounted volume appear as subdirectories of the network file system. The network file system location where the volume is attached is called a mount point.

The disks within a volume are typically organized as one or more redundant arrays of independent (or inexpensive) disks (RAID). RAID implementations enhance the reliability and integrity of data storage through the redundant writing of data "stripes" across a given number of physical disks in the RAID group, and the appropriate caching of parity information with respect to the striped data. RAID implementations provide data integrity, i.e., the ability to recover from data write errors and other forms of data corruption. However, if the storage server associated with a RAID group goes offline, all of the volumes in the attached RAID group will be unavailable to the network. Clustered storage server systems (e.g., storage server systems employing the NetApp Cluster Failover application available from Network Appliance, Inc.) have been developed to address this data availability problem.

Clustering configures two or more storage servers as partners to stand in for each other in the event that one of the storage servers goes offline, a process known as failover. In a clustered storage server configuration, one storage server is able to take over the duties of another storage server (takeover phase) when the other storage server becomes unavailable, and transfer the duties back to the other storage server when it again becomes available (giveback phase). A storage server may be taken offline intentionally (e.g., for maintenance or upgrade) or may go offline unexpectedly due to a failure. Each storage server in a cluster provides information to the other storage server(s) about its own operational status, so another storage server in the cluster can take over from a storage server that goes offline.

Conventional network storage solutions are modeled on a quality of service (QoS) paradigm that attempts to guarantee system performance levels (e.g., input-output operations per second). In a failover situation, however, the QoS model breaks down because the network's activity load is distributed over a system with diminished resources (i.e., fewer storage servers). What is needed, therefore, is a technique for managing network service levels before, during and after failover that provides meaningful, adaptive controls based on the availability of system resources and context dependent needs of clients.

SUMMARY OF EMBODIMENTS OF THE INVENTION

In one embodiment of the invention, a method for integrating control of service during cluster failover includes detecting a failure in a first storage server having a first control-of-service policy to control a first storage system, and executing a cluster takeover procedure in a second storage server having a second control-of-service policy to control a second storage system. The cluster takeover procedure includes taking control of the first storage system and merging the first control-of-service policy with the second control of service policy to create a merged control of service policy to control the first storage system and the second storage system.

Other embodiments of the invention include a system and apparatus that can perform such a method. Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system for integrating control of service during failover in a clustered storage server system are described. In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention.

Figure 1:
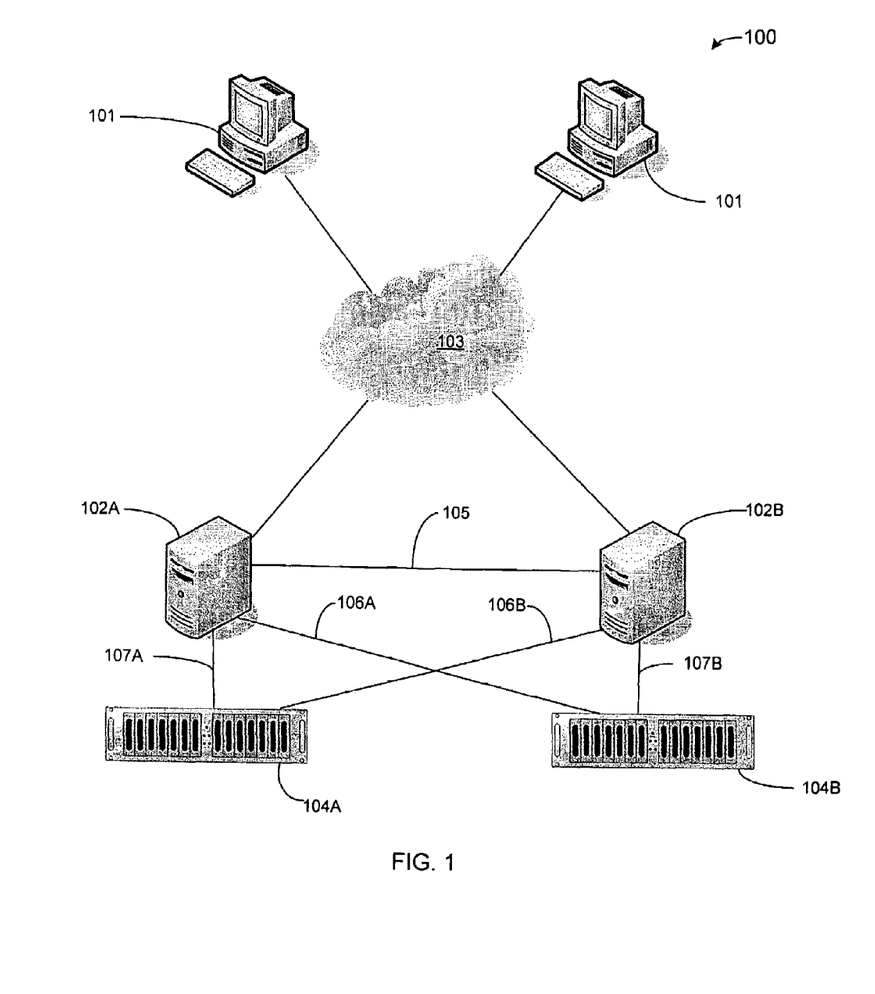
FIG. 1 illustrates a network environment that includes a clustered storage server configuration.

FIG. 1 illustrates an example of a network environment 100 which incorporates a pair of clustered storage servers 102A and 102B. While FIG. 1 illustrates a cluster with two storage servers by way of example, a cluster may contain more than two storage servers. In FIG. 1, storage server 102A is coupled locally to a storage system 104A via connection 107A, and storage server 102B is coupled locally to a storage system 104B via connection 107B. Each of storage systems 104A and 104B may include a set of mass storage devices (e.g., a RAID array). The storage servers 102A and 102B are also connected to a set of clients 101 through a network 103, such as a local area network (LAN). Each of the clients 101 may be, for example, a conventional personal computer (PC), a workstation or the like. Storage system 104A is controlled by storage server 102A and storage system 104B is controlled by storage server 102B. Each storage server receives and responds to various read and write requests from the clients 101, directed to data stored in or to be stored in the storage systems. The mass storage devices in the storage systems may be, for example, conventional magnetic disks, optical disks such as CD-ROM or DVD based storage, magneto-optical (MO) storage, or any other type of non-volatile storage devices suitable for storing large quantities of data.

Each storage server may have a distributed architecture; for example, it may include a separate N- ("network") blade and D- (disk) blade (not shown). In such an embodiment, the N-blade is used to communicate with clients 101, while the D-blade includes file system functionality and is used to communicate with the attached storage system. The N-blade and D-blade are in communication with each other. Alternatively, each storage server may have an integrated architecture, where the network and data components are all contained in a single box. Storage servers 102A and 102B may be coupled to each other through a cluster interconnect 105 through which each storage servers can monitor the status of the other server(s) in the cluster. Under normal operating conditions, each storage server controls its own storage system as noted above. In addition, storage server 102A has a connection 106A with storage system 104B, and storage server 102B has a connection 106B with storage system 104A. These connections may be used to control the storage systems during cluster failover activities as described below. Each storage server may handle several classes of activity, including client activity (data accesses), system activity (data management) and the above mentioned status monitoring activity. If either storage server fails (or is taken offline), the other storage server may detect the failure, activate its connection to the failed storage server's storage system, mount the volumes associated with the failed storage server to make those volumes available to the network, and take over the activities of the failed storage server.

Figure 2:
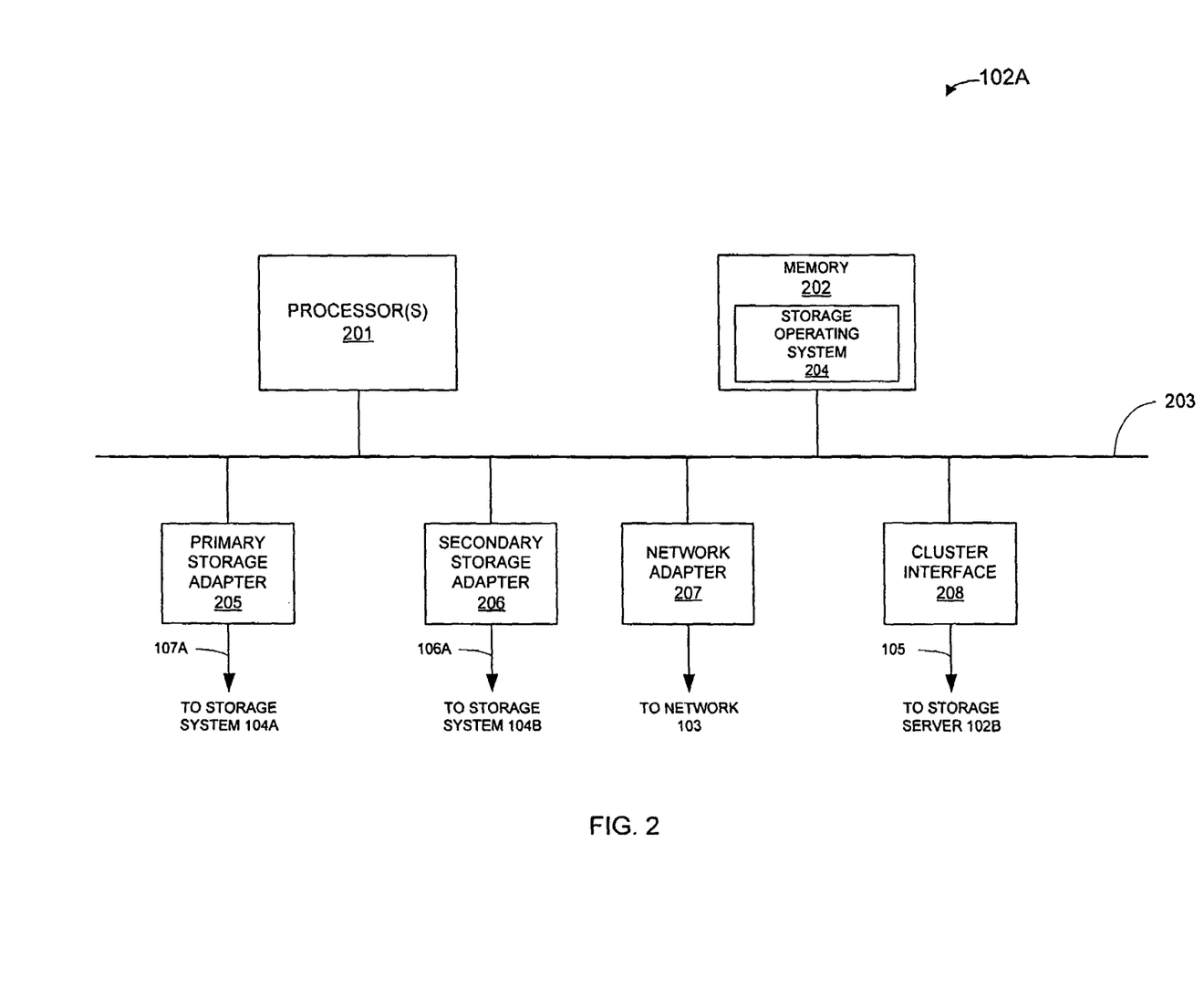
FIG. 2 illustrates the architecture of a storage server that can implement an embodiment of the invention.

FIG. 2 is a block diagram illustrating an exemplary architecture of a storage server, such as storage server 102A, according to certain embodiments of the invention. Certain standard and well-known components which are not germane to the present invention may not be shown. The storage server 102A includes one or more processors 201 and memory 202 coupled to a bus system 203. The bus system 203 shown in FIG. 2 is an abstraction that represents any one or more separate physical buses and/or point-to-point connections, connected by appropriate bridges, adapters and/or controllers. The bus system 203, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 201 are the central processing units (CPUs) of the storage server 102A and, thus, control the overall operation of the storage server. In certain embodiments, the processors 201 accomplish this by executing software stored in memory 202. A processor 201 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 202 is or includes the main memory of storage server 102A. Memory 202 represents any form of random access memory (RAM), read-only memory (ROM), flash memory, or the like, or a combination of such devices. Memory 202 may include, among other things, the storage operating system 204 of storage server 102, in which the control of service and cluster failover techniques discussed below may be implemented.

Also connected to the processors 201 through the bus system 203 are a primary storage adapter 205, a secondary storage adapter 206 and a network adapter 207. The primary storage adapter 205 allows storage server 102A to access storage system 104A via connection 107A. The secondary storage adapter 206 allows storage server 102A to access storage system 104B via connection 106A. Storage adapters 206 and 206 may be, for example, Fibre Channel adapters, a SCSI adapters or the like. The network adapter 207 provides storage server 102A with the ability to communicate with remote devices such as the clients 101, over a network such as network 103, and may be, for example, an Ethernet adapter or the like.

Figure 3:
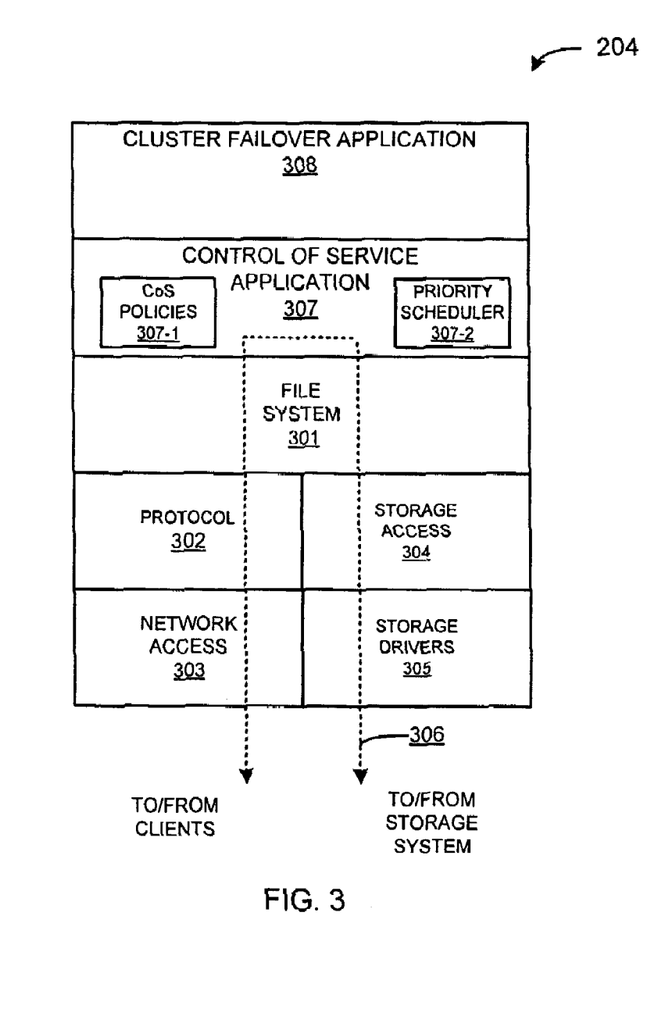
FIG. 3 illustrates an operating system of a storage server in one embodiment of the invention.

FIG. 3 illustrates an example of the storage operating system 204 of storage server 102A. As shown, the storage operating system 204 includes several modules, or "layers." These layers include a file system 301. The file system 301 is application-layer software that keeps track of the directory structure (hierarchy) of the data stored in a storage system, such as storage system 104A, and controls read/write operations on the data (e.g., executes read/write operations on storage system 104A in response to client requests). Logically "under" the file system 301, the operating system 204 also includes a protocol layer 302 and an associated network access layer 303, to allow the storage server 102A to communicate over the network 103 (e.g., with clients 101). The protocol layer 302 implements one or more network protocols, such as Network File System (NFS) Protocol, Common Internet File System (CIFS) Protocol, Hypertext Transfer Protocol (HTTP) and/or Transmission Control Protocol/Internet Protocol (TCP/IP) or the like. The network access layer 303 includes one or more drivers which implement one or more lower-level protocols, such as Ethernet, to communicate over the network 103.

Also logically under the file system 301, the storage operating system 204 includes a storage access layer 304 and an associated storage driver layer 305, to allow the storage server 102A to communicate with storage systems such as storage systems 104A and 104B. The storage access layer 304 implements a disk storage protocol, such as RAID, while the storage driver layer 305 implements a lower-level storage device access protocol, such as Fibre Channel Protocol (FCP) or SCSI. Also shown in FIG. 3 is a path 306 of data flow, through the storage operating system 204, associated with a read or write operation. The flow and control of read and write operations in a storage operating system such as storage operating system 204 are known in the art and, accordingly, are not described here in detail.

In one embodiment of the invention, the storage operating system 204 includes a control of service (CoS) application 307, logically above the file system 301, to protect storage server 102A from instability under heavy load conditions (e.g., requests for read and/or write access per unit time which exceed the bandwidth of storage server 102. The CoS application 307 includes CoS policy 307-1 which allows users (e.g., a client or a system administrator) to specify rules and procedures that trap and reorder file system access requests (e.g. client access requests and/or system access requests) sent to the file system 301. As noted below, the CoS policy 307-1 may also be maintained within the storage system controlled by the storage server (e.g., storage system 104A controlled by storage server 102A), to facilitate cluster failover operations.

File system access requests may include access requests from clients and/or access requests generated from within the file system (e.g., periodic file maintenance requests such as file integrity checks, file backup and the like). The CoS policy may include rules and procedures for prioritizing the order of execution of file system access requests. For example, a client's payroll application may be given a higher execution priority than a system request for file mirroring. CoS functionality is implemented by intercepting incoming requests (messages) and redirecting messages into message queues for prioritization.

In one embodiment, described in co-pending U.S. patent application Ser. No. 11/166,478, which is incorporated herein by reference, CoS application 307 creates a message queue for each logical volume maintained by the filing system 301. Each queue may have two message lists; one list for system messages such as, for example, data management and/or file maintenance requests as described above, and one list for client messages (e.g., data access requests). The distinction may be based on a protocol type associated with the message. The protocol of a message is the special set of rules that end points in a data connection use when they communicate. Protocols exist at several levels in a data connection. For example, there are protocols for data interchange at the hardware device level and protocols for data interchange at the application program level. In the standard model known as Open Systems Interconnection (OSI), there are one or more protocols at each layer in the data exchange that both ends of the exchange must recognize and observe. Protocols are often described in an industry or international standard. Some message protocols (e.g., NFS, CIFS, ISCSI, FCP) may be associated only with client access requests, and are automatically stored in the user message list. A message that is not associated with any one of the user protocols may be considered to be a system-initiated message and therefore placed in the system message list. It will be appreciated that other determinants for classifying and prioritizing client messages and system messages may be used, such as a specific classes of workload, estimated time to execute a message, average latency of a queue and/or the communication port associated with the message, for example.

Messages are removed from a queue by a priority scheduler 307-2. Message removal may proceed in two steps; choosing a message queue and determining whether a client or system message is to be executed. In one embodiment, as described in co-pending U.S. patent application Ser. No. 11/166,478, messages are removed from a queue and dispatched by the priority scheduler 307-2 when it is appropriate to dispatch a message (e.g., the message is time critical or a necessary precursor to subsequent messages). A queue may be chosen based on relative priorities of the classes of workloads associated with each queue as well as various fairness mechanisms (e.g., a modified Monte Carlo random selection). The determination of whether a client-initiated or a system-initiated message is to be dispatched from a queue for execution may be based on the relative priorities of system-initiated messages and user-initiated messages (e.g., utilizing system/user weight property for the selected queue), and on a random number used to determine which message to de-queue.

Queues may be assigned relative priority weights, based on the user specified CoS policy with respect to specific logical volumes and message types. The storage operating system 204 may also include a cluster failover application 308 as illustrated in FIG. 3. Cluster failover application 308 has access to the CoS policy 307-1 and message queues handled by priority scheduler 307-2, and is configured to control message priorities during cluster failover operations as described below.

Figure 4:
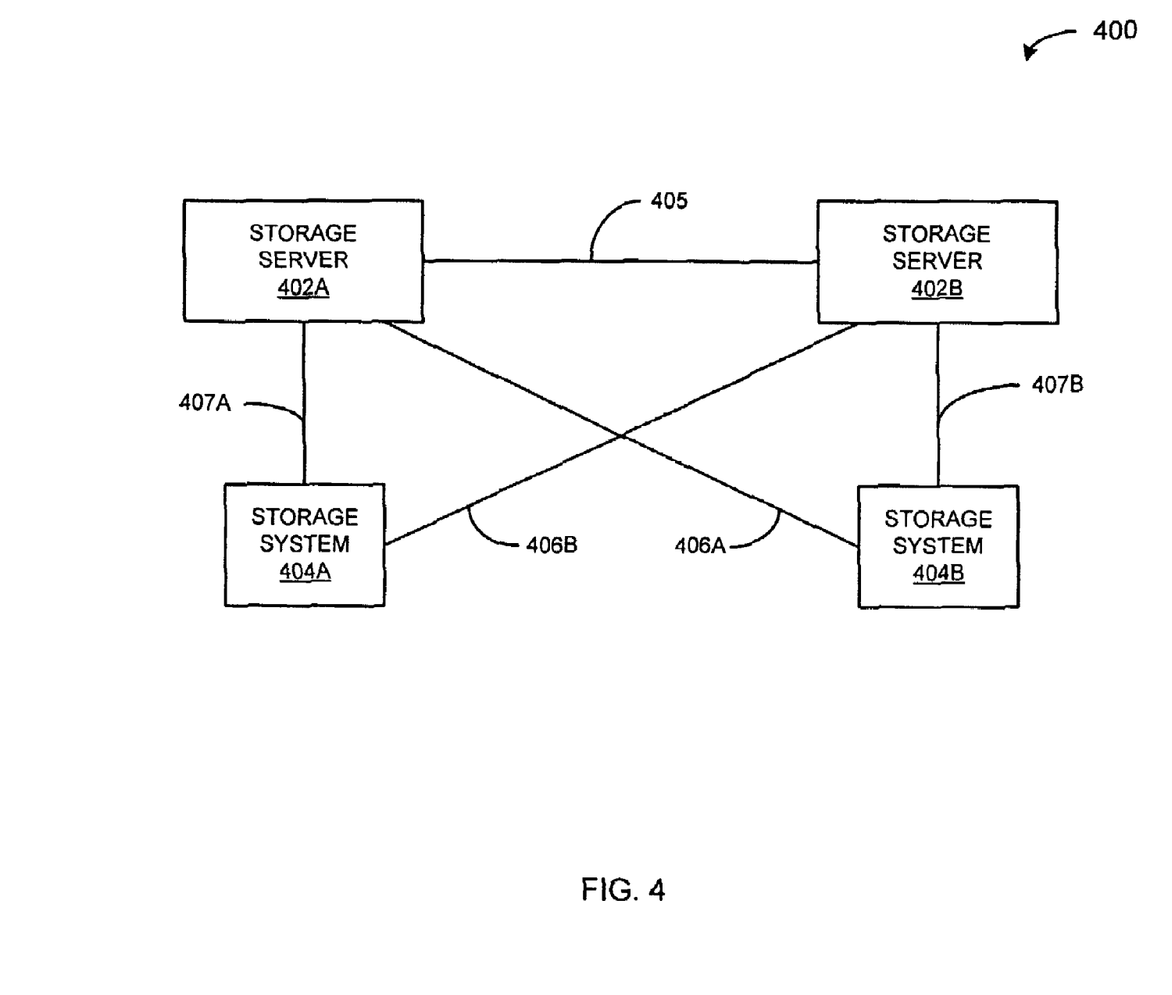
FIG. 4 illustrates a configuration of clustered storage servers in one embodiment of the invention.
Figure 5:
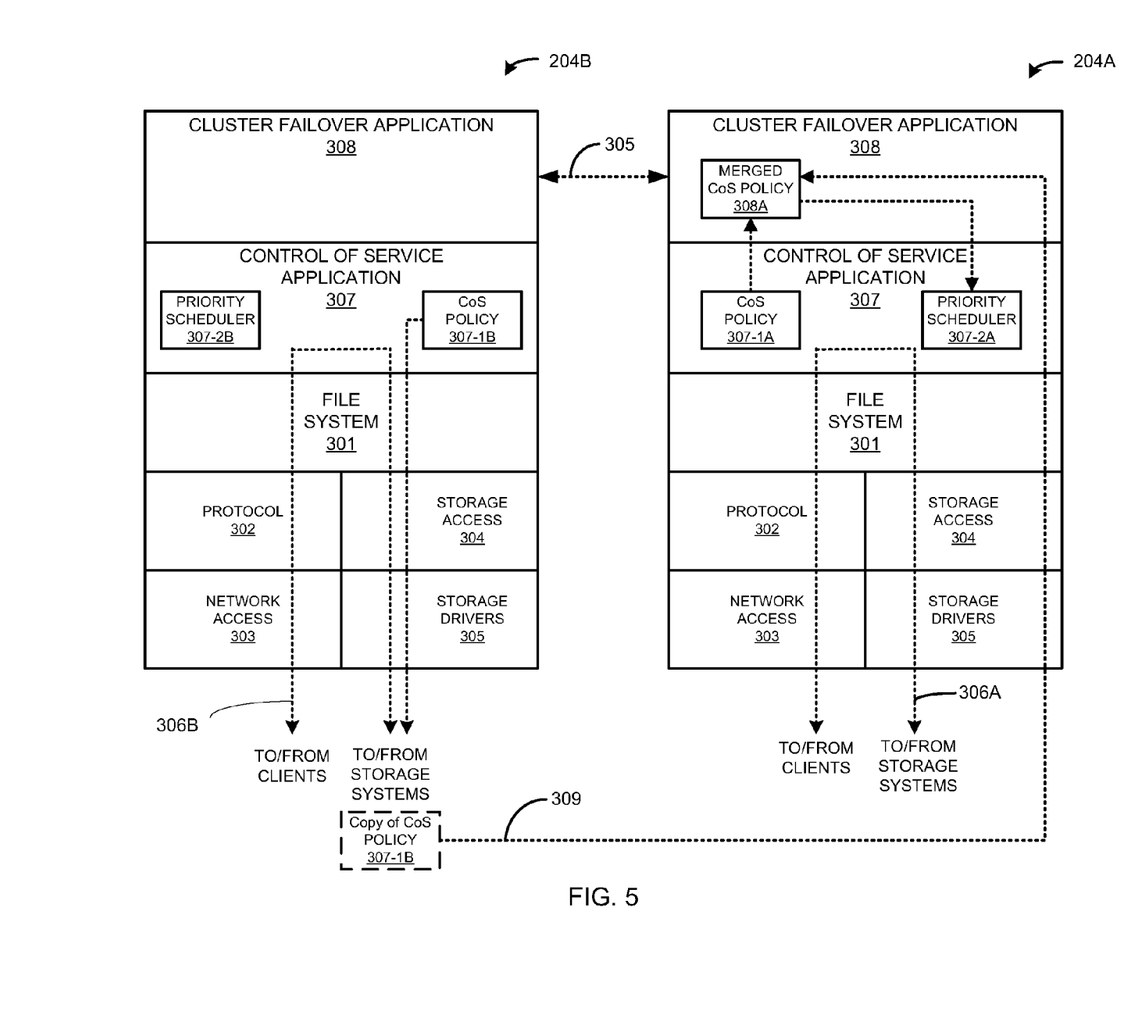
FIG. 5 illustrates operating systems of clustered storage servers in one embodiment of the invention.

FIG. 4 illustrates a clustered storage server system 400, in one embodiment, analogous to the cluster consisting of storage server 102A and storage server 102B in FIG. 1. As illustrated in FIG. 5, the physical interconnections between storage servers 402A and 402B and storage systems 404A and 404B may be separate connections such as, for example, interconnections 403A, 403B, 406A and 406B. Alternatively, the connections may be bussed or shared connections as are known in the art. Cluster interconnect 405 may be a dedicated connection or a shared connection to transmit self-health data between the clustered storage servers 402A and 402B.

FIG. 4 illustrates the logical structure of two storage operating systems 204A and 204B in an exemplary cluster having two storage servers, where path 309 represents the logical data path (corresponding to the physical connection 105 in FIG. 1) between cluster failover applications in two representative storage servers, such as storage servers 102A and 102B. This data path between storage servers carries self-health monitoring information between storage servers, as previously described.

FIG. 5 illustrates a pair of storage operating systems 204A and 204B corresponding to the storage servers 402A and 402B in FIG. 4. In FIG. 5, path 306A represents a logical path that includes data path 407A between storage server 402A and storage system 404A, and data path 406A between storage server 402A and storage system 404B. Similarly, path 306B represents a logical path that includes data path 407B between storage server 402B and storage system 404B, and data path 406B between storage server 402B and storage system 404A. Storage operating system 204A may have its own CoS policy 307-1A and its own priority scheduler 307-2A. Storage operating system 204B may have its own CoS policy 307-1B and its own priority scheduler 307-2B. As illustrated in FIG. 5, the other architectural components of storage operating systems 204A and 204B (e.g., file system 301, CoS application 307, and cluster failover application 308) may be the same in each storage operating system. It will be appreciated by those skilled in the art that these components may be implemented differently in each storage operating system, in a cluster of storage servers, and still provide functional interfaces which are compatible with adjacent layers in the storage operating system.

In one embodiment, with reference to FIGS. 4 and 5, if storage server 402B goes offline, the cluster failover application 308 in the remaining online storage server 402A detects the loss of the self-health status signal from storage server 402B on interconnect 405, and executes a cluster takeover procedure. In one embodiment, as part of the cluster takeover procedure, storage server 402A takes control of storage system 404B from storage server 402B via connection 406A. Storage server 402A reads a copy of control-of-service policy 307-1B from storage system 404B via logical data path 309 and merges the control-of-service policy 307-1B with the control-of-service policy 307-1A for storage system 404A, creating a merged control-of-service policy 308-1A in storage operating system 204A to control storage systems 404A and 404B. In one embodiment, as described in greater detail below, storage server 402A then transitions from control-of-service policy 307-1A to the merged control-of-service policy 308A which may be maintained in cluster failover application 308 in storage operating system 204A.

In one embodiment, storage server 402A takes control of storage system 404B. Storage server 402A activates control path 406A and brings storage system 404B online by mounting the logical volumes associated with storage system 404B within a directory system maintained by storage server 402A. As described below, storage server 402A, under control of cluster failover application 308, may initially lower user message priorities associated with storage system 404B and storage system 404A to prevent system overload during the transition to the merged CoS policy 308A.

In one embodiment, storage server 402A begins the transition to the merged CoS policy 308A by lowering the execution priorities of all user messages associated with storage system 404A to reserve processing resources for subsequent takeover activities related to storage system 404B and its logical volumes. In one embodiment, the execution priorities of the user messages associated with storage system 404A may be made uniformly low. In an alternative embodiment, relative execution priorities among user messages, which existed before the takeover procedure started, may be maintained while reducing the average priority levels of the user messages.

As described in co-pending U.S. patent application Ser. No. 11/166,478, the priority of messages (and/or the priority of weighted message queues) may translate to a maximum permitted allocation of available system resources (e.g., percentage of CPU time, memory allocation and number of disk reads or input-output operations per second) to a specific message or message queue. Priorities may be classified, for example as very_high (e.g., 95% allocation), high (e.g., 75% allocation), medium (e.g., 50% allocation), low (e.g., 25% allocation) and very_low (e.g., 5% allocation) for example.

Next, storage server 402A may reduce all system message priorities, with one exception, to a lowest priority so that any activity that is not user driven is de-prioritized and does not consume processing resources. The exception includes messages which are issued by the failover application 308, itself, in executing the takeover procedure, because it is generally desirable to complete the takeover procedure as quickly as possible. Therefore, all messages generated by the failover application 308 receive the highest execution priority. As noted above, as part of bringing storage system 404B online, storage server 402A may lower the priorities of all user message associated with storage system 404B to a priority level approximately equal to that of the user messages associated with storage system 404A. This step may be taken to insure that the takeover process is not overloaded with user access requests to storage system 404B that may have queued up since the failover event (failure of storage server 402B) occurred. The transition is completed when the merged CoS policy 308A takes over from CoS policy 307-1A to control both storage systems 404A and 404B. In one embodiment, messages issued by cluster failover application 308 are maintained at a high priority at all times that storage server 402B is offline.

Merging refers to a set of rules for combining the policies associated with the local volumes and the partner volumes. In one embodiment, for example, the merged policy may default to the policy in force at the operational storage server (e.g., storage server 402A) before the takeover. In other embodiments, the policy may default to the policy in force at the failed storage server (e.g., storage server 402B) before the takeover, or to a weighted average of the two policies based on relative priorities of user applications associated with each storage server before the takeover. Once the takeover process is complete, the system 400 may operate indefinitely in takeover mode until the offline storage server 402B is restored to normal operation.

When storage server 402B comes back online (e.g., repaired or returned from scheduled maintenance), storage server 402A then detects the health status signal of storage server 402B, via cluster interconnect 405 (logical connection 305 between cluster failover applications 308 in storage operating systems 204A and 204B), and begins to execute a cluster giveback procedure under control of the cluster failover application 308. In one embodiment, storage server 402A may copy the merged CoS policy 308A to storage system 404B and unmount the logical volumes associated with storage system 404B, releasing storage system 404B to storage server 402B, so that storage server 402B can bring storage system 404B online under the merged CoS policy 308A.

In a next phase of the cluster giveback procedure, storage server 402A lowers the priority of all user messages and system messages associated with storage system 404A to the lowest priority until storage server completes a cluster takeback procedure as described below. Storage server 402A then resumes control of storage system 404A under CoS policy 307-1A.

In one embodiment, storage server 402B executes a cluster takeback procedure, under control of its copy of cluster failover application 308, in which storage server 402B takes control of storage system 404B under the merged CoS policy 308A, brings storage system 404B online and resumes control of storage system 404B under CoS policy 307-1B. In one embodiment, in a manner analogous to that described for storage server 402A, storage server 402B may bring storage system 404B online by mounting the logical volumes associated with storage system 404B (as described above), setting user and system message priorities associated with storage system 404B to a highest priority to clear messages which have queued up during the giveback-takeback procedures, and setting system failover messages to a highest priority until the CoS policy 307-1B is resumed in storage server 402B.

Figure 6A:
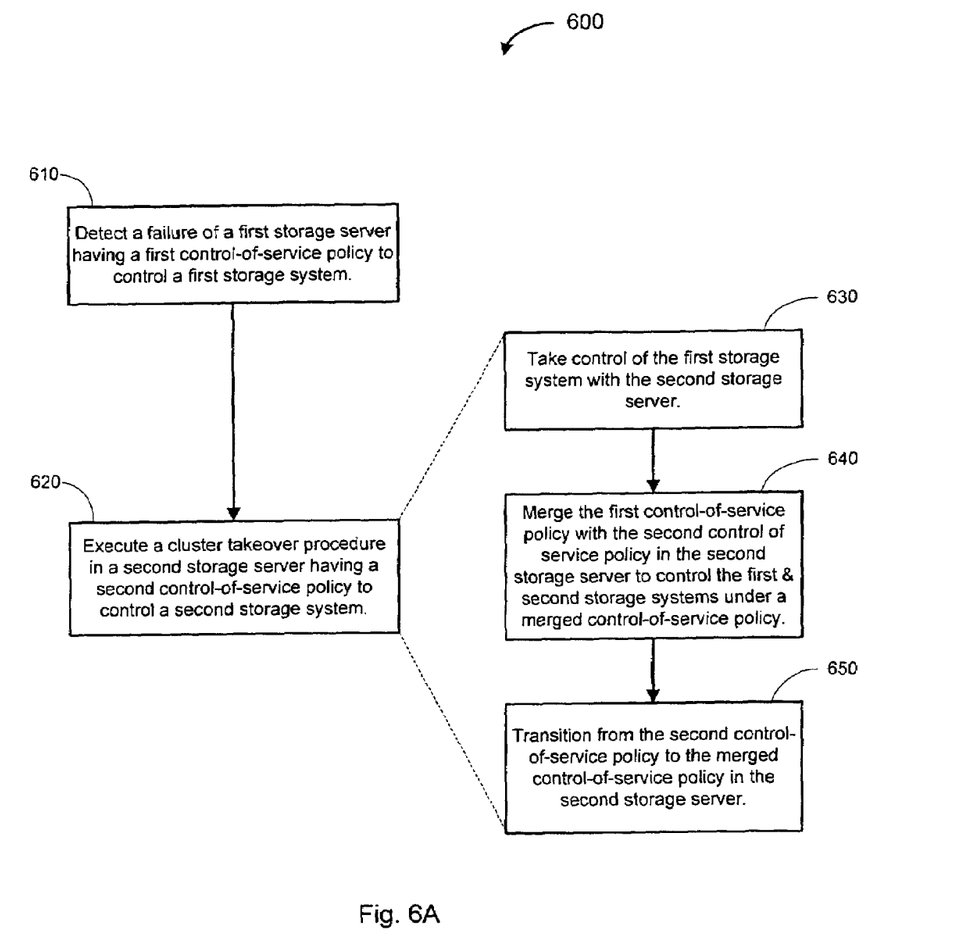
FIG. 6A is a flowchart illustrating a method in one embodiment of the invention.

With reference to FIGS. 4 and 5, FIG. 6A is a flowchart illustrating a method 600 in one embodiment of the invention.

Figure 6B:
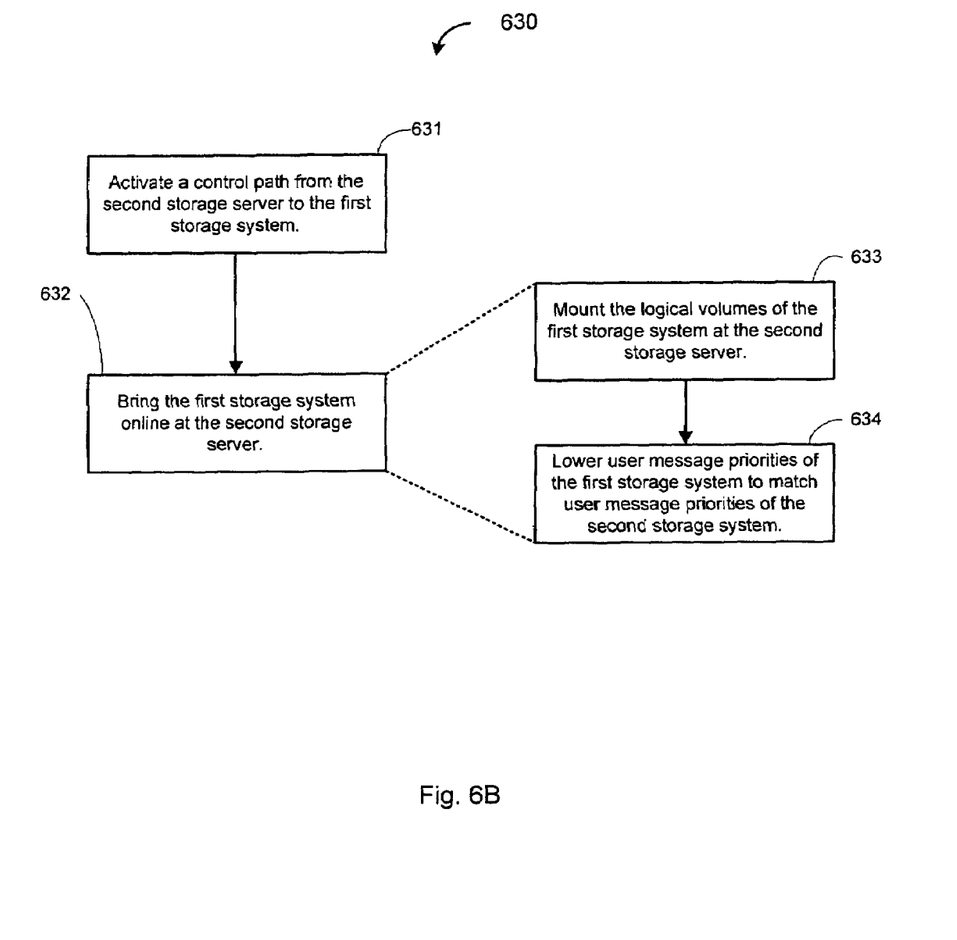
FIG. 6B is a flowchart further illustrating the method of FIG. 6A in one embodiment of the invention.
Figure 6C:
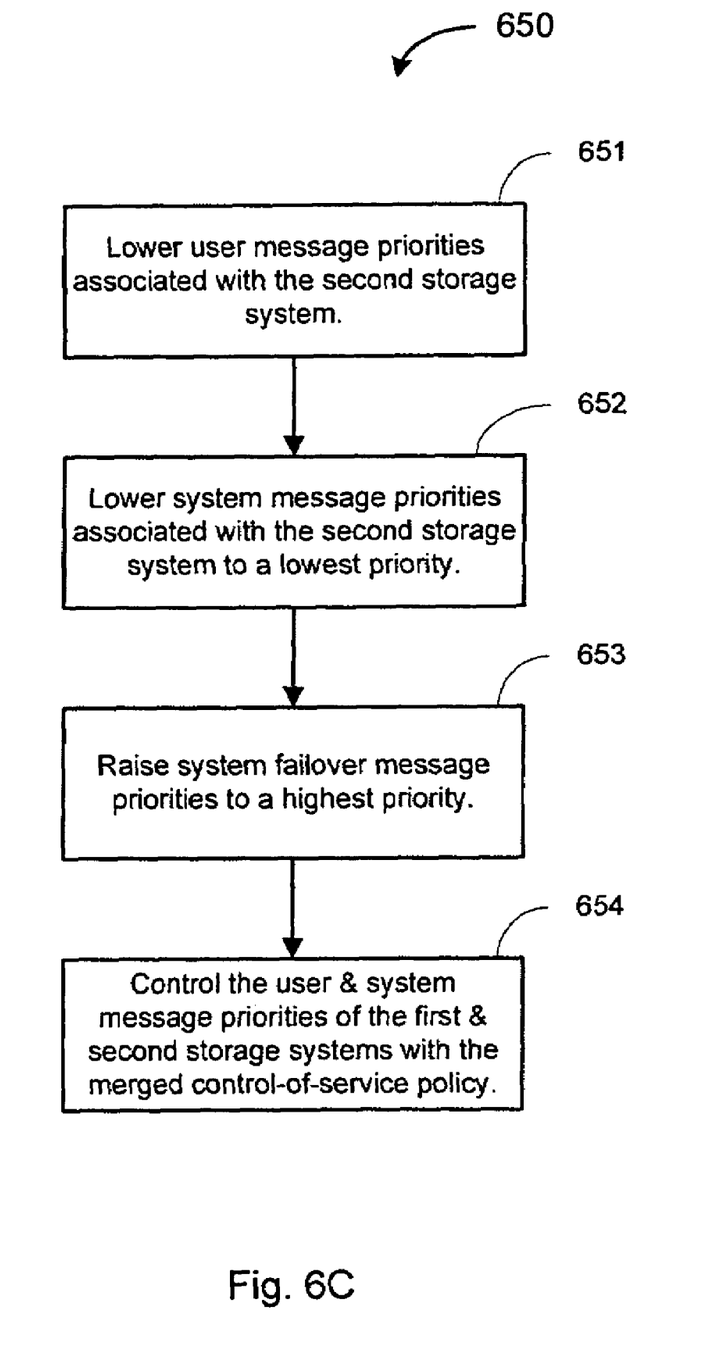
FIG. 6C is a flowchart further illustrating the method of FIG. 6B in one embodiment of the invention.

FIGS. 6A through 6C are flowcharts illustrating a cluster failover method 600 in one embodiment. At step 601, a failure is detected in a first storage server having a first control-of-service (CoS) policy to control a first storage system. At step 620, a second storage server, which has a second CoS policy to control a second storage system, executes a cluster takeover procedure. In one embodiment, the cluster takeover procedure may include: taking control of the first storage system with the second storage server (step 630), merging the first CoS policy with the second CoS policy to create a merged CoS policy to control both the first storage system and the second storage system (step 640), and transitioning from the second CoS policy to the merged CoS policy in the second storage server (step 650).

In one embodiment, step 630 may include: activating a control path from the second storage server to the first storage system (step 631), and bringing the first storage system online at the second storage server (step 632). In one embodiment, step 632 may include: mounting logical volumes associated with the first storage system at the second storage server (step 633), and lowering user message priorities of the first storage system to match lowered user message priorities of the second storage system as described below (step 634).

In one embodiment, step 650 may include: lowering user message priorities associated with the second storage system (step 651), lowering system message priorities associated with the second storage system to a lowest priority (step 652), raising system failover message priorities to a highest priority (step 653), and controlling the user and system message priorities of both the first and second storage systems with the merged CoS policy (step 654).

Figure 7A:
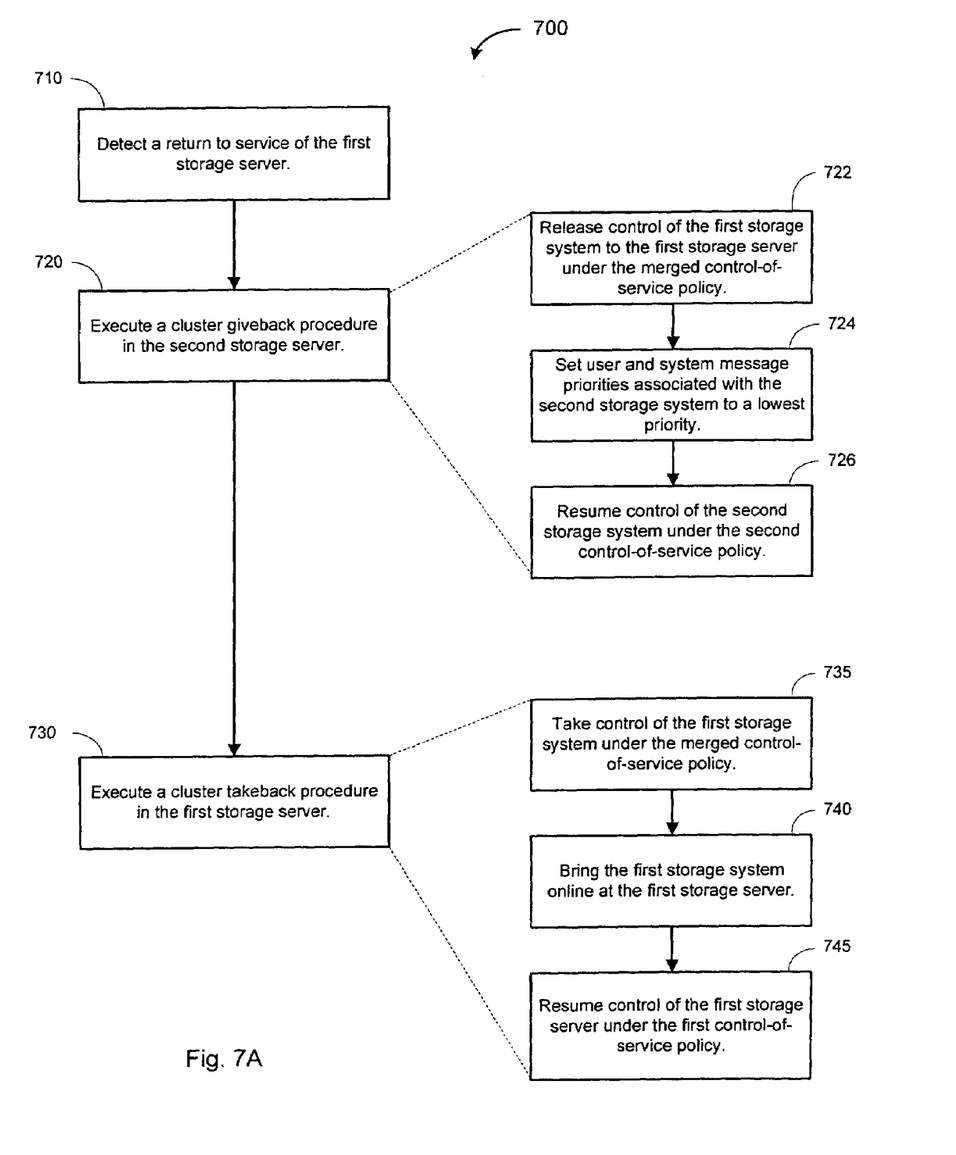
FIG. 7A is a flowchart illustrating another method in one embodiment of the invention.
Figure 7B:
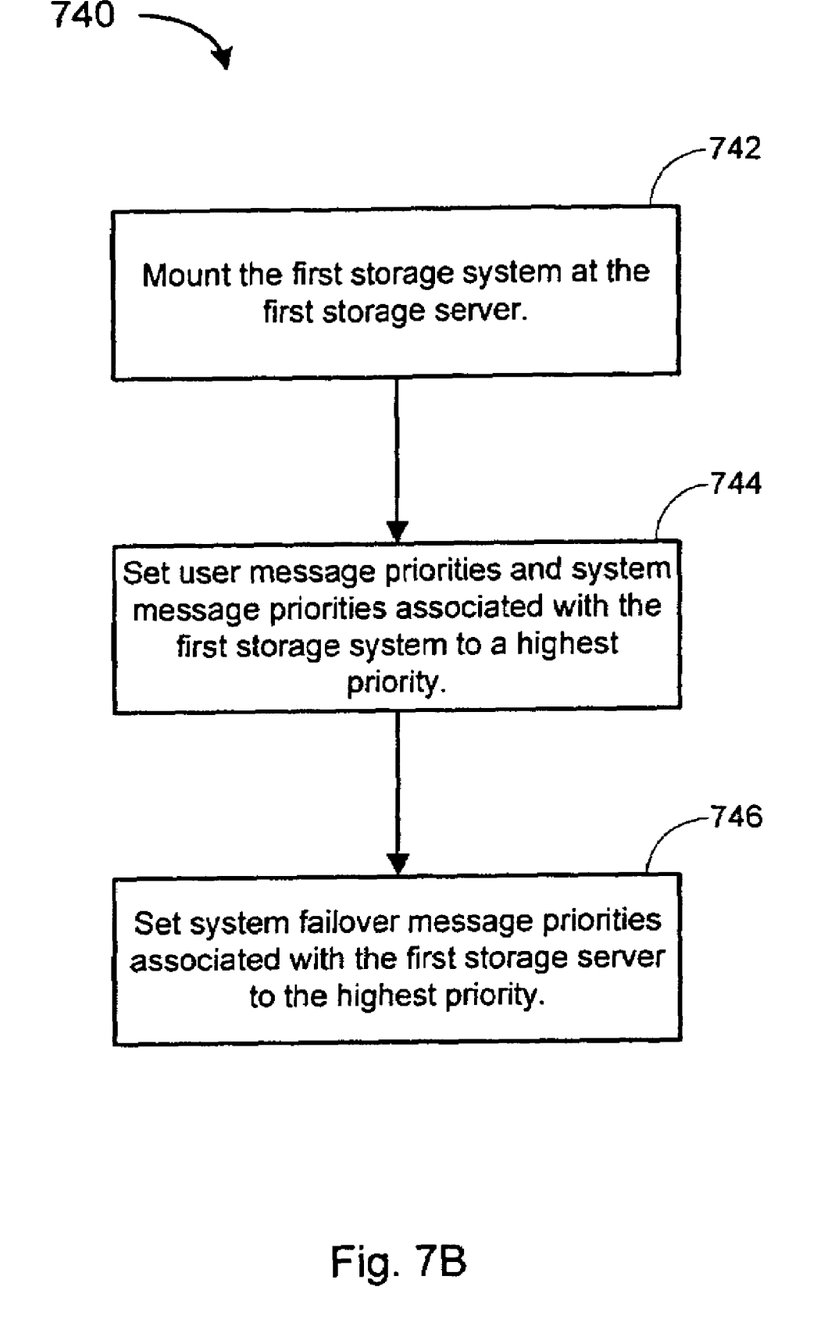
FIG. 7B is a flowchart further illustrating the method of FIG. 7A in one embodiment of the invention.

FIGS. 7A and 7B are flowcharts illustrating a cluster failover method 700 in one embodiment. At step 710, a return to service of the first storage server is detected by the second storage server. At step 720, the second storage server executes a cluster giveback procedure. At step 730, the first storage server executes a cluster takeback procedure. In one embodiment, step 720 may include: releasing control of the first storage system to the first storage server under the merged CoS policy (step 722), setting user and system message priorities associated with the second storage system to a lowest priority (step 724), and resuming control of the second storage system under the second CoS policy (step 726). In one embodiment, step 730 may include: taking control of the first storage system under the merged CoS policy (step 735), bringing the first storage system online at the first storage server (step 740), and resuming control of the first storage system under the first CoS policy (step 745).

In one embodiment, as illustrated in FIG. 7B, step 740 may include: mounting the first storage system at the first storage server (step 742), setting user and system message priorities associated with the first storage system to a highest priority (step 744), and setting system failover message priorities associated with the first storage server to the highest priority (step 746).

Thus, a method, apparatus and system for integrating control of service during a cluster failover have been described. It will be apparent from the foregoing description that aspects of the present invention may be embodied, at least in part, in software. That is, the techniques may be carried out in a computer system or other data processing system in response to its processor, such as processor(s) 201, executing sequences of instructions contained in a memory, such as memory 202. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations may be described as being performed by or caused by software code to simplify description. However, those skilled in the art will recognize what is meant by such expressions is that the functions result from execution of the code by a processor, such as processors 201.

A machine-readable medium can be used to store software and data which when executed by a data processing system causes the system to perform various methods of the present invention. This executable software and data may be stored in various places including, for example, memory 202 or any other device that is capable of storing software programs and/or data.

Thus, a machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method in a clustered storage server system, comprising:
   detecting a failure in a first storage server having a first control-of-service policy to control a first storage system, wherein the first control-of-service policy includes a first plurality of scheduling rules to prioritize file system access requests within the first storage server during normal operation of the first storage server; and
   executing a cluster takeover procedure in a second storage server having a second control-of-service policy to control a second storage system, wherein the second control-of-service policy includes a second plurality of scheduling rules to prioritize file system access requests within the second storage server during normal operation of the second storage server, the cluster takeover procedure comprising:
      taking control of the first storage system with the second storage server; and
      merging the first control-of-service policy with the second control-of-service policy in the second storage server to create a merged control-of-service policy in the second storage server to control the first storage system and the second storage system.

2. The method of claim 1, wherein executing the cluster takeover procedure in the second storage server further comprises transitioning from the second control-of-service policy to the merged control-of-service policy in the second storage server.

3. The method of claim 2, wherein taking control of the first storage system with the second storage server comprises:
   activating a path from the second storage server to the first storage system to read control-of-service policy information associated with the first storage system; and
   bringing the first storage system online at the second storage server.

4. The method of claim 3, wherein bringing the first storage system online comprises:
   mounting the first storage system at the second storage server; and
   matching user message priorities of the first storage system to user message priorities of the second storage system.

5. The method of claim 3, wherein transitioning from the second control-of-service policy to the merged control-of-service policy comprises:
   lowering user message priorities associated with the second storage system;
   lowering system message priorities associated with the second storage system to a lowest priority;
   raising system failover message priorities to a highest priority; and
   managing user and system message priorities associated with the first storage system, and the user and system message priorities associated with the second storage system, with the merged control-of-service policy.

6. The method of claim 2, further comprising:
   detecting a return to service of the first storage server;
   executing a cluster giveback procedure in the second storage server comprising:
      releasing control of the first storage system to the first storage server under the merged control-of-service policy;
      setting user message priorities and system message priorities associated with the second storage system to a lowest priority; and
      resuming control of the second storage system under the second control-of-service policy.

7. The method of claim 6, further comprising executing a cluster takeback procedure in the first storage server comprising:
   taking control of the first storage system under the merged control-of-service policy;
   bringing the first storage system online at the first storage server; and
   resuming control of the first storage system under the first control-of-service policy.

8. The method of claim 7, wherein bringing the first storage system online at the first storage server comprises:
   mounting the first storage system at the first storage server;
   setting user message priorities and system message priorities associated with the first storage system to a highest priority; and
   setting the system failover message priorities associated with the first storage server to the highest priority.

9. A system, comprising:
   a first storage server coupled to a first storage system and a second storage system, the first storage server configured to control the first storage system according to a first control-of-service policy, wherein the first control-of-service policy includes a first plurality of scheduling rules to prioritize file system access requests within the first storage server during normal operation of the first storage server;
   a second storage server coupled with the first storage server, the first storage system and the second storage system, the second storage server configured to
      control the second storage system according to a second control-of-service policy, wherein the second control-of-service policy includes a second plurality of scheduling rules to prioritize file system access requests within the second storage server during normal operation of the second storage server,
      detect a failure in the first storage server, and
      execute a cluster takeover procedure wherein the second storage server is configured to take control of the first storage system, bring the first storage system online, merge the first control-of-service policy with the second control-of-service policy, and control the first storage system and the second storage system according to a merged control-of-service policy.

10. The system of claim 9, wherein the second storage server is further configured to detect a return to service of the first storage server and to execute a cluster giveback procedure, wherein the second storage server is configured to release control of the first storage system to the first storage server under the merged control-of-service policy, and to resume control of the second storage system according to the second control-of-service policy.

11. The system of claim 10, wherein the first storage server is configured to execute a cluster takeback procedure, wherein the first storage server is configured to take control of the first storage system under the merged control-of-service policy, to bring the first storage system online, and to resume control of the first storage system according to the first control-of-service policy.

12. An article of manufacture, comprising a machine-readable storage medium including data that, when accessed by a machine, cause the machine to perform operations comprising a method, the method comprising:
    detecting a failure in a first storage server having a first control-of-service policy to control a first storage system, wherein the first control-of-service policy includes a first plurality of scheduling rules to prioritize file system access requests within the first storage server during normal operation of the first storage server; and
    executing a cluster takeover procedure in a second storage server having a second control-of-service policy to control a second storage system, wherein the second control-of-service policy includes a second plurality of scheduling rules to prioritize file system access requests within the second storage server during normal operation of the second storage server, the cluster takeover procedure comprising:
        taking control of the first storage system with the second storage server; and
        merging the first control-of-service policy with the second control-of-service policy in the second storage server to create a merged control-of-service policy in the second storage server to control the first storage system and the second storage system.

13. The article of manufacture of claim 12, wherein executing the cluster takeover procedure in the second storage server further comprises transitioning from the second control-of-service policy to the merged control-of-service policy in the second storage server.

14. The article of manufacture of claim 13, wherein taking control of the first storage system with the second storage server comprises:
    activating a path from the second storage server to the first storage system to read control-of-service policy information associated with the first storage system; and
    bringing the first storage system online at the second storage server.

15. The article of manufacture of claim 14, wherein bringing the first storage system online comprises:
    mounting the first storage system at the second storage server; and
    matching user message priorities of the first storage system to user message priorities of the second storage system.

16. The article of manufacture of claim 14, wherein transitioning from the second control-of-service policy to the merged control-of-service policy comprises:
    lowering user message priorities associated with the second storage system;
    lowering system message priorities associated with the second storage system to a lowest priority;
    raising system failover message priorities to a highest priority; and
    managing user and system message priorities associated with the first storage system, and the user and system message priorities associated with the second storage system, with the merged control-of-service policy.

17. The article of manufacture of claim 13, the method further comprising:
    detecting a return to service of the first storage server; and
    executing a cluster giveback procedure in the second storage server comprising:
        releasing control of the first storage system to the first storage server under the merged control-of-service policy;
        setting user message priorities and system message priorities associated with the second storage system to a lowest priority; and
        resuming control of the second storage system under the second control-of-service policy.

18. The article of manufacture of claim 17, the method further comprising executing a cluster takeback procedure in the first storage server comprising:
    taking control of the first storage system under the merged control-of-service policy;
    bringing the first storage system online at the first storage server; and
    resuming control of the first storage system under the first control-of-service policy.

19. The article of manufacture of claim 18, wherein bringing the first storage system online at the first storage server comprises:
    mounting the first storage system at the first storage server;
    setting user message priorities and system message priorities associated with the first storage system to a highest priority; and
    setting the system failover message priorities associated with the first storage server to the highest priority.

20. A storage server, comprising:
    a cluster interface to communicate with another storage server having a first control-of-service policy to control a first storage system, wherein the first control-of-service policy includes a first plurality of scheduling rules to prioritize file system access requests within the first storage server during normal operation of the first storage server;
    one or more storage adapters to communicate with the first storage system and a second storage system;
    a processor coupled with the cluster interface and the one or more storage adapters,
        the processor to implement a storage operating system having a second control-of-service policy to control the second storage system, wherein the second control-of-service policy includes a second plurality of scheduling rules to prioritize file system access requests within the second storage server during normal operation of the second storage server,
        the processor further to detect a failure in the other storage server, and to execute a takeover procedure to take control of the first storage system, merge the first control-of-service policy with the second control-of-service policy, and control the first storage system and the second storage system with a merged control-of-service policy.

21. The storage server of claim 20, the processor further to transition the storage server from the second control-of-service policy to the merged control-of-service policy.

22. The storage server of claim 21, the processor further to bring the first storage system online, wherein the processor is configured to mount logical volumes of the first storage system and match user message priorities associated with the first storage system to user message priorities associated with the second storage system.

23. The storage server of claim 21, wherein to transition from the second control-of-service policy to the merged control-of-service policy, the processor further to:
   lower user message priorities associated with the second storage system;
   lower system message priorities associated with the second storage system to a lowest priority;
   raise system failover message priorities to a highest priority; and
   manage user and system message priorities associated with the first storage system, and the user and system message priorities associated with the second storage system, with the merged control-of-service policy.

24. The storage server of claim 21, the processor further to:
   detect a return to service of the first storage server;
   execute a cluster giveback procedure, wherein the processor is configured to:
      release control of the first storage system to the first storage server under the merged control-of-service policy;
      set user message priorities and system message priorities associated with the second storage system to a lowest priority; and
      resume control of the second storage system under the second control-of-service policy.

* * * * *